US012773693B2

(12) United States Patent
Denison et al.

(10) Patent No.: US 12,773,693 B2
(45) Date of Patent: Oct. 27, 2026

(54) MICROFLUIDIC DEVICE CHAMBER PILLARS

(71) Applicant: Hewlett-Packard Development Company, L.P., Spring, TX (US)

(72) Inventors: Carson Denison, Corvallis (AE); Pavel Kornilovich, Corvallis (AE); Alexander Govyadinov, Corvallis (AE); Erik D. Torniainen, Corvallis (AE); Richard W. Seaver, Corvallis (AE); Anand Samuel Jebakumar, Corvallis (AE)

(73) Assignee: Hewlett-Packard Development Company, L.P., Spring, TX (US)

( * ) Notice: Subject to any disclaimer, the term of this patent is extended or adjusted under 35 U.S.C. 154(b) by 451 days.

(21) Appl. No.: 18/573,690

(22) PCT Filed: Jun. 30, 2021

(86) PCT No.: PCT/US2021/039806

§ 371 (c)(1),
(2) Date: Dec. 22, 2023

(87) PCT Pub. No.: WO2023/277896

PCT Pub. Date: Jan. 5, 2023

(65) Prior Publication Data

US 2024/0299942 A1 Sep. 12, 2024

(51) Int. Cl.
*B01L 3/00* (2006.01)

(52) U.S. Cl.
CPC . *B01L 3/502746* (2013.01); *B01L 2300/0816* (2013.01); *B01L 2300/087* (2013.01); *B01L 2300/0874* (2013.01); *B01L 2400/086* (2013.01)

(58) Field of Classification Search
CPC ....... B01L 3/502746; B01L 2300/0816; B01L 2300/087; B01L 2300/0874;
(Continued)

(56) References Cited

U.S. PATENT DOCUMENTS

| | | | |
|---|---|---|---|
| 5,427,663 | A | 6/1995 | Austin et al. |
| 5,837,115 | A | 11/1998 | Austin et al. |

(Continued)

FOREIGN PATENT DOCUMENTS

| | | | |
|---|---|---|---|
| CN | 1715932 | B | 4/2012 |
| CN | 203525731 | U | 4/2014 |

(Continued)

OTHER PUBLICATIONS

Hayes et al., "Pulsatory Mixing of Laminar Flow Using Bubble-Driven Micro-Pumps", Proceeding is of the ASME 2018 International Mechanical Engineering Congress and Exposition, IMECE2018-86937, Nov. 9-15, 2018, Pittsburgh, USA, pp. 8.

(Continued)

*Primary Examiner* — Christine T Mui
(74) *Attorney, Agent, or Firm* — Foley & Lardner LLP

(57) ABSTRACT

A microfluidic device includes a chamber having a floor, a ceiling, and an inlet. The microfluidic device includes pillars extending from the floor to the ceiling of the chamber. Each pillar has a leading surface or corner, a trailing surface or corner opposite the leading surface or corner, and trailing side surfaces adjoining the trailing surface or corner. Each pillar is oriented along a corresponding ray intersecting the leading surface or corner and the trailing surface or corner. Adjacent pillars have a turn angle between the corresponding rays of the adjacent pillars, and each pillar has a pillar angle between the trailing side surfaces thereof. The turn and pillar angles are based on a fluidic contact angle to promote (Continued)

fluid flow from the inlet throughout the chamber during priming without fluidic pinning.

13 Claims, 9 Drawing Sheets

(58) Field of Classification Search
CPC ......... B01L 2400/086; B01L 3/502723; B01L 2200/0684; B01L 2400/088
USPC ........................................... 422/503, 500, 50
See application file for complete search history.

(56) References Cited

U.S. PATENT DOCUMENTS

| | | | |
|---|---|---|---|
| 7,686,029 | B2 | 3/2010 | Nakao |
| 8,475,626 | B2 | 7/2013 | Rops et al. |
| 9,174,182 | B2 | 11/2015 | Wimberger-Friedl et al. |
| 9,771,553 | B2 | 9/2017 | Vulto et al. |
| 9,822,890 | B2 | 11/2017 | Juncker et al. |
| 2008/0259720 | A1 | 10/2008 | Lam et al. |
| 2010/0089529 | A1 | 4/2010 | Barholm-Hansen et al. |
| 2011/0079552 | A1 | 4/2011 | Yagi |
| 2011/0086427 | A1 | 4/2011 | Faris et al. |
| 2015/0119280 | A1 | 4/2015 | Srinivas et al. |
| 2015/0196909 | A1 | 7/2015 | Jones et al. |
| 2016/0136642 | A1 | 5/2016 | Eriksen et al. |
| 2016/0136643 | A1 | 5/2016 | Larson |
| 2016/0228873 | A1 | 8/2016 | Govyadinov et al. |
| 2016/0272934 | A1 | 9/2016 | Chander et al. |
| 2016/0279637 | A1 | 9/2016 | Sarioglu et al. |
| 2017/0333900 | A1 | 11/2017 | Grisham et al. |
| 2017/0355945 | A1 | 12/2017 | Kamm et al. |
| 2018/0029032 | A1 | 2/2018 | Govyadinov et al. |
| 2018/0272340 | A1 | 9/2018 | Govyadinov et al. |
| 2019/0060898 | A1 | 2/2019 | Mourey et al. |
| 2019/0226953 | A1 | 7/2019 | Wunsch et al. |
| 2020/0139408 | A1 | 5/2020 | Ito |
| 2020/0191796 | A1 | 6/2020 | Mack et al. |
| 2020/0254407 | A1 | 8/2020 | Wilson et al. |
| 2021/0245155 | A1 | 8/2021 | Dittus et al. |
| 2022/0135399 | A1 | 5/2022 | Puebla Hellmann et al. |

FOREIGN PATENT DOCUMENTS

| | | | |
|---|---|---|---|
| CN | 107824105 | A | 3/2018 |
| CN | 209906795 | U | 1/2020 |
| EP | 1416303 | A2 | 5/2004 |
| EP | 3675876 | A1 | 7/2020 |
| EP | 3862090 | A1 | 8/2021 |
| JP | 2011-072989 | A | 4/2011 |
| JP | 2021-512310 | A | 5/2021 |
| WO | 2008/024070 | A1 | 2/2008 |
| WO | 2014/046687 | A1 | 3/2014 |
| WO | 2014/206420 | A1 | 12/2014 |
| WO | 2014/207257 | A1 | 12/2014 |
| WO | 2016/051272 | A1 | 4/2016 |
| WO | 2019/046052 | A1 | 3/2019 |
| WO | 2020/013915 | A1 | 1/2020 |
| WO | 2021/247750 | A1 | 12/2021 |
| WO | 2022/159097 | A1 | 7/2022 |

OTHER PUBLICATIONS

Huang c. et al., "Tile implementation of a thermal bubble actuated microfluidic chip with microvalve, micropump and micromixer", Sensors and Actuators A: Physical A, vol. 210, Feb. 28, 2014, pp. 147-156.

Pompano et al, "Control of Initiation, Rate, and Routing of Spontaneous Capillary-Driven Flow of Liquid Droplets through Microfluidic Channels on SlipChip", Langmuir, vol. 28, Jan. 10, 2012, pp. 1931-1941.

MICROFLUIDIC DEVICE CHAMBER PILLARS

CROSS-REFERENCE TO RELATED APPLICATIONS

This application is a U.S. National Stage Patent Application under 35 U.S.C. § 371 of PCT/US2021/039806, filed Jun. 30, 2021, which is hereby incorporated by reference in its entirety.

BACKGROUND

Microfluidic devices leverage the physical and chemical properties of liquids and gases at a small scale, such as at a sub-millimeter scale. Microfluidic devices geometrically constrain fluids to precisely control and manipulate the fluids for a wide variety of different applications. Such applications can include life sciences applications such as digital microfluidic (DMF) and DNA applications and single cell applications, as well as applications as varied as lab-on-a-chip, inkjet, microreactors, electrophoresis, capacitance sensing, fluidic heat sink, and fluidic sensor probe applications, among other applications.

DETAILED DESCRIPTION

Figure 1A:
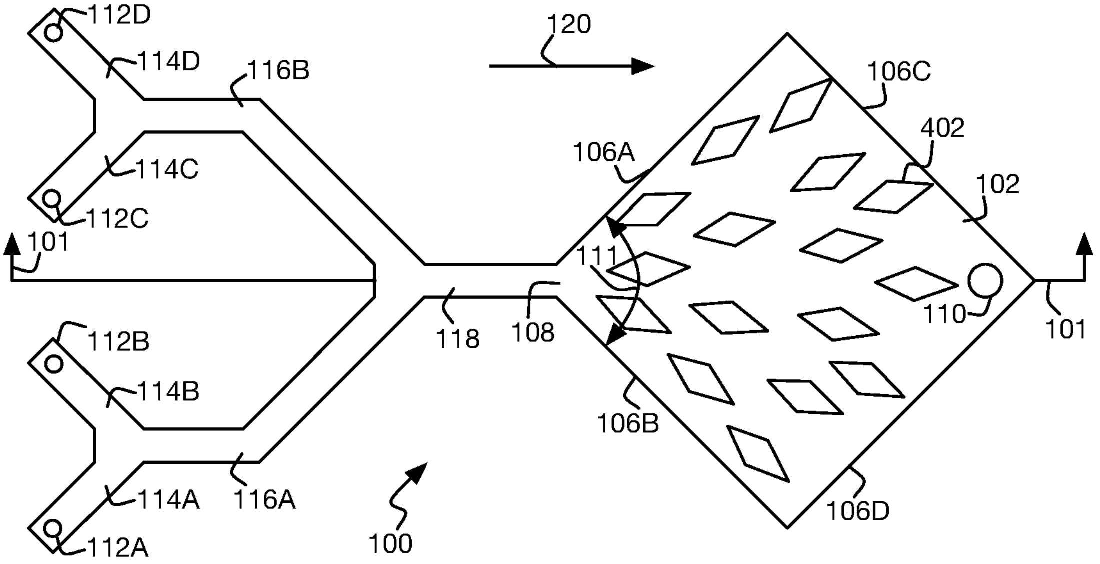
FIGS. 1A and 1B are a cross-sectional top view diagram and a front view diagram, respectively, of an example microfluidic device with chamber pillars that can promote fluid flow throughout the chamber during priming.

Microfluidic devices often include channels and chambers. Fluid may passively or actively flow from a channel to a chamber to which the channel is directly fluidically connected at an inlet of the chamber. Active fluid flow results when external forces, such as due to microfluidic pumps, assist the flow of fluid. By comparison, passive fluid flow results when no such external forces assist the flow of fluid, and instead capillary and other forces resulting from the interaction of the fluid and the material from which the microfluidic device is fabricated cause the flow of fluid.

When a chamber is initially empty of fluid and instead contains air or other gas, causing fluid to initially flow into and throughout the chamber is referred to as priming. Priming may fail, however. For instance, in the case of passive priming in which no external forces like pumps are used, the initial capillary and other forces may be insufficient for the fluid to flow much past the inlet of the chamber at which the channel is directly fluidically connected, which is a phenomenon referred to as pinning. Furthermore, even if pinning does not occur, the flow of fluid throughout the chamber may be incomplete. Specifically, the fluid may trap air or other gas pockets at sidewalls of the chamber, including at the chamber's corners.

To promote fluid flow throughout the chamber during passive priming of the microfluidic device, surfactants may be added to the fluid, which reduces the fluidic contact angle between the fluid and the chamber surfaces. However, in certain types of applications, surfactants may not be able to be added to the fluid. For example, for microfluidic devices used in life sciences applications, the fluid may be a biologic sample, such as blood, sweat, or saliva, which is mixed with one or multiple other types of fluids, such as reagents and solvents, to test the biologic sample for presence of a substance of interest, like a virus, drug, and so on. Introducing surfactants in such applications can contaminate the sample, or otherwise reduce the accuracy or reliability of the microfluidic devices for the life sciences applications in question.

The fluidic contact angle between the fluid and the chamber surfaces may instead be reduced in order to promote fluid flow throughout the chamber during microfluidic device priming by modifying the chamber surfaces themselves. For example, the microfluidic device may be fabricated from a different material that provides for a lower fluidic contact angle. However, microfluidic device fabrication from different materials may result in new manufacturing processes having to be developed and/or fabrication equipment having to be retooled or replaced at prohibitive cost.

As another example, the chamber surfaces of the microfluidic device may be treated after fabrication to decrease the fluidic contact angle. For instance, the surfaces may be subjected to annealing, or different types of plasma ionic etching. The surface may be subjected to ionic or another type of deposition of another material that has a lower fluidic contact angle. Such treatment processes may also be cost prohibitive, however, and may not prove long-lived. For example, over time the efficacy of the treatment may degrade, with a resulting increase in fluidic contact angle.

Microfluidic devices are described herein that ameliorate these and other issues that can occur during priming. A microfluidic device includes pillars within a chamber having an inlet. Each pillar has a leading surface or corner, a trailing surface or corner opposite the leading surface or corner, and trailing side surfaces adjoining the trailing surface or corner. Each pillar is oriented along a corresponding ray intersecting the leading surface or corner and the trailing surface or corner. Adjacent pillars have a turn angle between their corresponding rays, and each pillar has a pillar angle between its trailing side surfaces.

The turn and pillar angles are based on a fluidic contact angle to promote fluid flow from the inlet throughout the chamber during priming and without trapping gas and within fluidic pinning. For example, the sum of the turn and pillar angles can be less than a threshold angle based on the fluidic contact angle. The threshold angle may be two times the difference between 90 degrees and the fluidic contact angle. Constraining the turn and pillar angles in this way results in the pillars serving to pull fluid in the directions along which they are oriented. In the case of water and a microfluidic device made of SU-8 epoxy negative photoresist, the fluidic contact angle is approximately 80 degrees at room temperature and atmospheric pressure, resulting in a threshold angle of about 20 degrees, such that the sum of the turn and pillar angles should be less than 20 degrees.

The described microfluidic devices promote complete fluid flow during passive priming without surfactants having to be introduced into the fluid. Therefore, the described microfluidic devices are more suitable for life sciences and other applications in which surfactant usage may be discouraged.

Furthermore, the described microfluidic devices promote complete fluid flow during passive priming without resorting to fabrication of the devices from non-standard materials or via post-fabrication treatment. Therefore, the described microfluidic devices can be fabricated using standard processing techniques and from ordinarily used materials, such as the aforementioned SU-8 epoxy negative photoresist.

Microfluidic devices may already include chamber pillars to prevent chamber collapse or sag. For example, for microfluidic devices fabricated from SU-8 epoxy negative photoresist, chambers having both a width and a length greater than 100 microns may be susceptible to chamber ceiling-to-chamber floor collapse or sag if the chambers did not include support pillars extending from the floor to the ceiling. Such chamber-support pillars may have to be present no less than every 100 microns, for instance, which can be considered the maximum inter-pillar separation distance to prevent chamber collapse or sag. That is, the distance between adjacent pillars should be no greater than 100 microns.

The described microfluidic devices therefore can leverage these pillars, which may already have to be present to prevent chamber collapse or sag, for another purpose: the promotion of chamber fluid flow during passive priming in particular. The pillars are shaped and positioned relative to one another to ensure that the microdevice fluidic chamber is completely filled with fluid during priming, without the trapping of gas pockets or bubbles. The pillars thus serve two purposes: their original purpose of preventing chamber collapse or sag, and their additional novel purpose of promoting chamber fluid flow during priming. The described microfluidic devices therefore may not be any more costly to fabricate than existing such devices, insofar as existing microfluidic devices may already have to include chamber pillars.

Figure 1B:
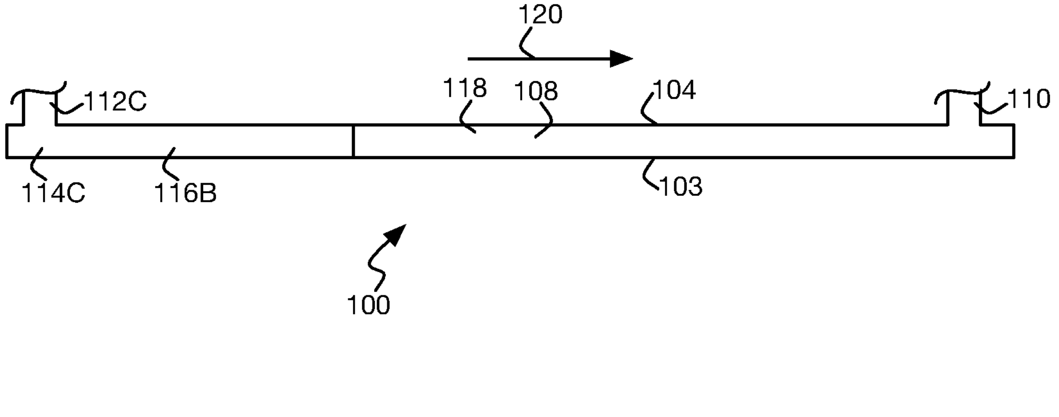

FIGS. 1A and 1B show cross-sectional top and front view diagrams, respectively, of an example microfluidic device 100. The cross-sectional front view of the microfluidic device 100 in FIG. 1B is at the cross-sectional line 101 of FIG. 1A. The microfluidic device 100 includes a chamber 102 in which pillars 402 are disposed; the pillars 402 are not shown in the cross-sectional front view of FIG. 1B for illustrative clarity. Different examples of the specific shape and specific orientation of the pillars 402 within the chamber 102 and their specific positioning relative to one another to promote fluid flow throughout the chamber 102 during priming are described in detail later in the detailed description. The shape, orientation, and positioning of the pillars 402 is thus just generally depicted in FIG. 1A.

The chamber 102 has a floor 103 and a ceiling 104, per FIG. 1B. The chamber 102 also has sidewalls 106A, 106B, 106C, and 106D, which are collectively referred to as the sidewalls 106. The chamber 102 has an inlet 108 at a corner of the chamber 102 and an outlet 110 that is opposite the inlet 108. The chamber 102 has a spread angle 111 that is defined as the angle between the sidewalls 106A and 106B adjacent to the inlet 108, and thus which is 90 degrees in the example. The inlet 108 in the example is specifically a side inlet whereas the outlet 110 is specifically a top outlet, per FIG. 1B. However, the inlet 108 may instead be a top intlet, and/or the outlet 110 may instead be a top outlet. Fluid is introduced into the chamber 102 at the inlet 108. As fluid fills the chamber 102, gas (e.g., air) exits the chamber 102 at the outlet 110 until the chamber 102 is completely filled with fluid. The microfluidic device 100 can subsequently be tilted and/or tipped over, for example, to empty the chamber of fluid.

In the specific example of FIGS. 1A and 1B, the microfluidic device 100 includes four inlets 112A, 112B, 112C, and 112D, collectively referred to as the inlets 112, at which fluid may be introduced into the device 100. For example, different fluid may be introduced at each inlet 112. The inlets 112A, 112B, 112C, and 112D lead to input channels 114A, 114B, 114C, and 114D, respectively, which are collectively referred to as the input channels 114. The input channels 114A and 114B lead to a mixing channel 116A in which the fluids introduced into the inlets 112A and 112B are mixed, and the input channels 114C and 114D lead to a mixing channel 116B in which the fluids introduced into the inlets 112C and 112D are mixed. The mixing channels 116A and 116B are collectively referred to as the mixing channels 116.

The mixing channels 116 lead to another mixing channel 118, in which the mixed fluid of the mixing channel 116A is mixed with the mixed fluid of the mixing channel 116B. The mixing channel 118 in turn is fluidically connected to the chamber 102 at the inlet 108 of the chamber 102. The mixed fluid of the mixing channel 118 therefore fills the chamber 102. The chamber 102 in the example thus serves to provide an amplifying volume of the mixed fluid: whereas the mixing channel 118 may just contain picoliters of fluid at any given time, the chamber 102 may be able to hold nanoliters to microliters of fluid. In the case in which the microfluidic device 100 is used in life sciences applications to test a biologic sample for the presence of a virus, drug, and so on, usage of the chamber 102 as an amplifying volume permits easier detection of the presence of the material of interest within the sample if such presence changes the color of the mixed fluid within the chamber 102.

In operation, then, fluid flow throughout the microfluidic device 100 occurs in the direction indicated by arrow 120. Fluid, such as of different types, is introduced at each inlet 112, and is mixed together as the fluid flows in the direction of the arrow 120, from the input channels 114, to the mixing channels 116, and to the mixing channel 118. Then, as the mixed fluid continues to flow in the direction of the arrow 120, the fluid enters the chamber 102 that stores a greater volume of the fluid than the mixing channel 118 does. A technician or other user can more easily inspect the fluid within the chamber 102 for change in color, and so on, than the fluid within the mixing channel 118.

The microfluidic device 100 depicted in FIGS. 1A and 1B is just one example of such a microfluidic device 100. The usage of pillars 402 within the chamber 102 to promote fluid flow during priming of the chamber 102—i.e., during the initial filling of the chamber 102 with fluid in displacement of gas like air—can be used within the chambers 102 of other types of microfluidic devices 100. The microfluidic devices 100 may be for a variety of different applications, including life sciences applications as described, fluidic ejection printhead applications, as well as other applications, including those referenced above. The shape of the chamber 102 and the position of the inlet 108 within the chamber 102 may also differ from that shown in FIGS. 1A and 1B.

Figure 2:
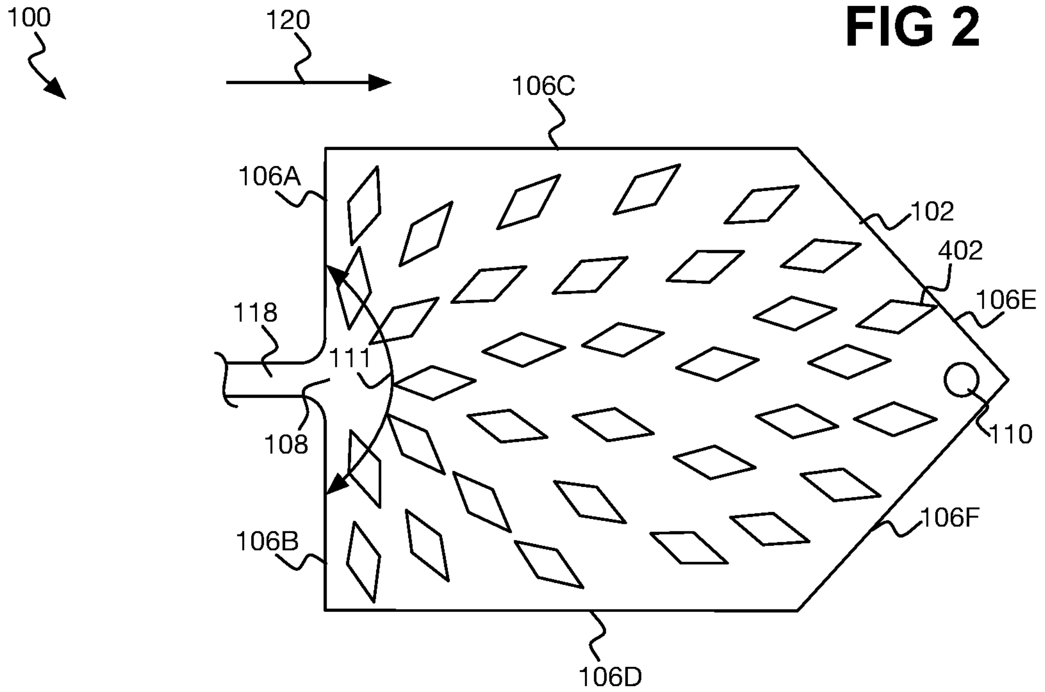
FIG. 2 is a cross-sectional top view diagram of another example microfluidic device with chamber pillars that can promote fluid flow throughout the chamber during priming.

FIG. 2 shows another example chamber 102 of a microfluidic device 100 in which pillars 402 can be disposed. In the example of FIG. 2, the inlet 108 leading from the channel 118 is positioned at a side of the chamber 102 as opposed to at a corner of the chamber 102 in FIGS. 1A and 1B. The outlet 110 is again opposite the inlet 108. The chamber 102 has sidewalls 106A and 106B adjacent the inlet 108 and between which the spread angle 111 is defined, which is 180 degrees in the example. The chamber 102 also has sidewalls 106C, 106D, 106E, and 106F, which along with the sidewalls 106A and 106B are collectively referred to as the sidewalls 106. The direction of fluid flow is again indicated by the arrow 120. FIG. 2 thus shows that a microfluidic device 100 can have a chamber 102 within an inlet 108 positioned differently than in FIGS. 1A and 1B. (As in FIG. 1A, the shape, orientation, and positioning of the pillars 402 is just generally depicted in FIG. 2.)

Figure 3:
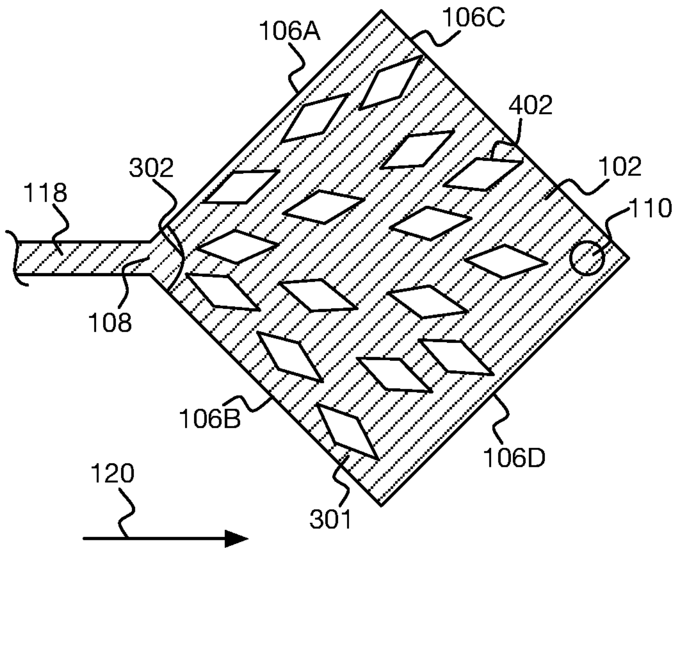
FIG. 3 is a cross-sectional top view diagram depicting example fluid flow throughout the chamber of a microfluidic device during priming.

FIG. 3 shows an example as to how fluid 301, which is indicated by shading, completely fills the chamber 102 of FIGS. 1A and 1B during passive priming. The fluid 301 flows from the channel 118 into the chamber 102 at the inlet 108, correspondingly displacing air or other gas that exits the chamber 102 at the outlet 110. The shape and positioning of the pillars 402 relative to one another results in the pillars 402 pulling the fluid 301 along their surfaces, resulting in the fluid 301 completely filling the chamber 102 in the example without the trapping of gas at the sidewalls 106, including at the corners where adjoining sidewalls 106 meet. The pillars 402 thus promote fluid 301 flow throughout the chamber 102.

By comparison, if the pillars 402 were absent, the fluid 301 may not enter the chamber 102 much past the inlet 108 during passive priming. Rather, the meniscus 302 of the fluid 301 may become pinned just inside of the inlet 108. The meniscus 302 of the fluid 301 does not actually become pinned, however, due to the presence of the pillars 402, which serve to pull the fluid 301 along their surfaces as noted. FIG. 3 thus shows the utility of the pillars 402 in promoting complete filling of the chamber 102 during passive priming.

Figure 4A:
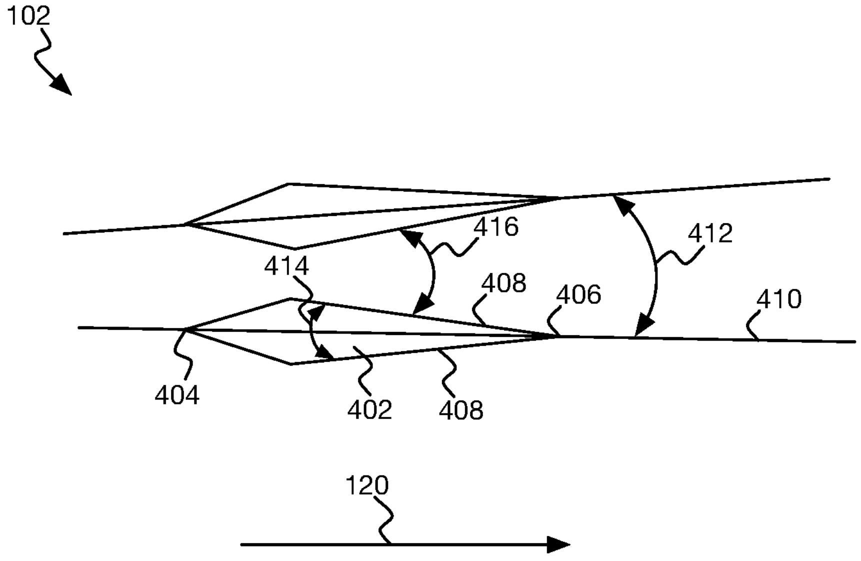
FIG. 4A is a diagram of two example microfluidic device chamber pillars in detail, as to how the pillars can be shaped and positioned relative to one another to promote fluid flow during priming.

FIG. 4A shows a cross-sectional top view diagram of two example pillars 402 of the microfluidic device chamber 102. FIG. 4A shows how the pillars 402 can be shaped and positioned relative to one another to promote fluid flow during priming. Each pillar 402 has a leading corner or surface 404 and a trailing corner or surface 406 opposite the leading corner or surface 404. In the example, the corners or surfaces 404 and 406 are each specifically a corner. Different examples of pillars 402 in which the corner or surface 404 and/or the corner or surface 406 is a surface are presented later in the detailed description.

The corner or surface 404 is leading and the corner or surface 406 is trailing with respect to the direction of fluid flow indicated by arrow 120. That is, fluid reaches the leading corner or surface 404 before it reaches the trailing corner or surface 406 of any pillar 402. The corner or surface 404 is thus leading and the corner or surface 406 is trailing with respect to the corner or surface 404 being closer to the chamber inlet 108 of FIG. 1A than the corner or surface 406 is, in consideration of the direction of fluid flow.

Each pillar 402 has trailing side surfaces 408 that adjoin the trailing corner or surface 406. Each pillar 402 is oriented along a corresponding ray 410 that intersects the leading corner or surface 404 and the trailing corner or surface 406. In the case in which the corner or surface 404 and/or the corner or surface 406 is a surface, the corresponding ray bisects each such surface in question. The depicted pillars 402 are adjacent to one another, and such adjacent pillars 402 have a turn angle 412 that is defined as the angle between their corresponding rays 410. The pillars 402 are radially oriented so long as the turn angle 412 is not zero degrees (in which case the pillars 402 are parallel to one another). Each pillar 402 also has a pillar angle 414 that is defined as the angle between its trailing side surfaces 408.

Adjacent pillars 402 have the same pillar angle 414. Adjacent pillars 402 further have an angle 416 between their adjacent trailing side surfaces 408. For the pillars 402 to promote the flow of fluid between them—i.e., for the pillars 402 to serve to pull fluid from their leading corners or surfaces 404 towards their trailing corners or surfaces 406—the angle 416 is less than a threshold angle that is based on the fluidic contact angle. The fluidic contact angle is the contact angle of the liquid fluid that is to flow throughout the microfluidic device chamber 102.

The fluidic contact angle is specifically the angle where a liquid-vapor interface of the fluid meets a solid surface, such as the sidewalls 106 of the chamber 102, and can be measured from the solid surface through the fluid. The fluidic contact angle is thus dependent on the material of the sidewalls 106 (i.e., the material from which the microfluidic device 100 is fabricated) and on the gas that fluidic priming displaces from the chamber 102 (e.g., air), in addition to the liquid fluid itself. The fluidic contact angle is also dependent on temperature and pressure.

The threshold angle is specifically equal to two times the difference between 90 degrees and the fluidic contact angle. That is, if the fluidic contact angle is FCA, then the threshold angle $CA=2\times(90-FCA)$. For example, for water on SU-8 epoxy negative photoresist, the fluidic contact angle is approximately 80 degrees at room temperature and atmospheric pressure. Therefore, the threshold angle in such implementations can be specified as 20 degrees.

The angle 416 is equal to the sum of turn angle 412 between the adjacent pillars 402, and the pillar angle 414 of either adjacent pillar 402. (As noted above, each adjacent pillar 402 has the same pillar angle 414.) Therefore, the sum of the turn angle 412 and the pillar angle 414 is less than the threshold angle to promote fluid flow between the pillars 402 by having each pillar 402 pull fluid at its leading corner or surface 404 towards its trailing corner or surface 406. That is, the sum of the turn angle 412 and the pillar angle 414 is less than two times the difference between 90 degrees and the fluidic contact angle.

This means that the greater the pillars 402 turn away from one another, the thinner and longer the pillars 402 can be.

That is, the greater the turn angle 412 between the pillars 402 is, the smaller the pillar angle 414 of each pillar 402 can be such that their sum remains less than the threshold angle (i.e., two times the difference between 90 degrees and the fluidic contact angle). Similarly, the less the pillars 402 turn away from one another, the thicker and shorter the pillars 402 can be. That is, the smaller the turn angle 412 between pillars 402 is, the larger the pillar angle 414 of each pillar 402 can be such that their sum remains less than the threshold angle.

Figure 4B:
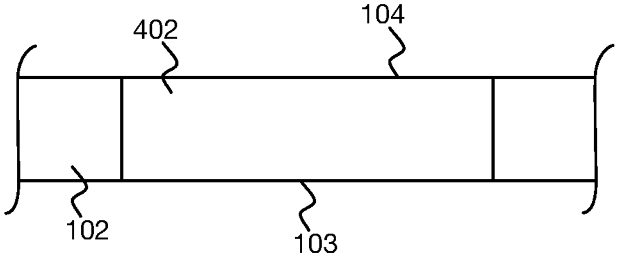
FIG. 4B is a front view diagram of an example such microfluidic device chamber pillar.

FIG. 4B shows a cross-sectional front view diagram of either pillar 402 of FIG. 4A within the chamber 102. The cross-sectional front view in FIG. 4B is along cross section of the corresponding ray 410 of the pillar 402 in FIG. 4A. FIG. 4B shows that each pillar 402 extends from the floor 103 of the chamber 102 to the ceiling 104 of the chamber 102. Therefore, the pillars 402 serve to support the chamber 102, preventing from the ceiling 104 from collapsing or sagging onto or towards the floor 103, while also promoting fluid flow during passive priming of the chamber 102 per FIG. 4A.

FIGS. 5A, 5B, 5C, 5D, and 5E show different example pillars 402. These figures thus show that the pillars 402 do not have to have the shape depicted in FIG. 4A, in which the pillar 402 is symmetrically shaped and specifically has a kite shape, which is a convex quadrilateral in which two pairs of adjacent sides are of equal length. (In the case in which all four sides are of equal length, the pillar 402 is a diamond or rhombus.) In other implementations, the pillar 402 may have a shape that is a convex quadrilateral that is not a kite, and in still other implementations, the pillar 402 may have a shape that is not a convex quadrilateral.

Figure 5A:
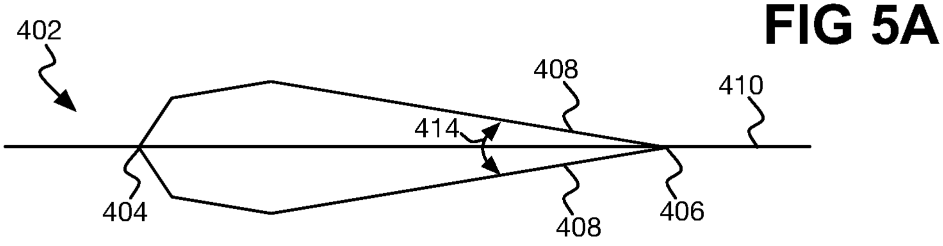
FIGS. 5A, 5B, 5C, 5D, and 5E are diagrams of other example microfluidic device chamber pillars having different shapes.

In FIG. 5A, the pillar 402 is symmetrically shaped but has six sides. The leading corner or surface 404 is specifically a corner, as is the trailing corner or surface 406. The pillar 402 is positioned or oriented along a corresponding ray 410 that intersects the corners or surfaces 404 and 406. The pillar 402 has a pillar angle 414 between its trailing side surfaces 408 that adjoin the trailing corner or surface 406.

Figure 5B:
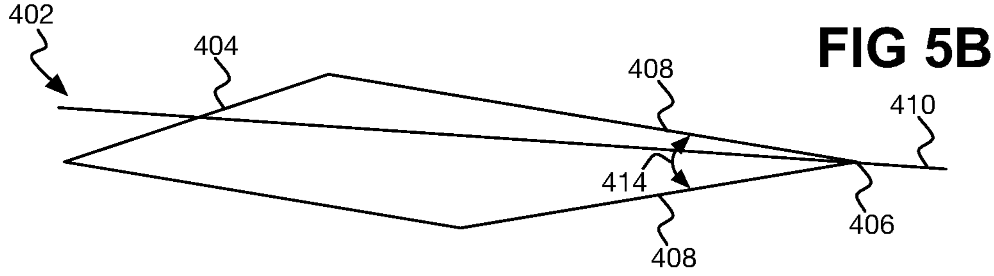

In FIG. 5B, the pillar 402 is asymmetrically shaped and has four sides. The leading corner or surface 404 is specifically a (non-corner) surface, whereas the trailing corner or surface 406 is a corner. The pillar 402 is positioned or oriented along a corresponding ray 410 that specifically bisects the leading corner or surface 404 and intersects the trailing corner or surface 406. The pillar 402 has a pillar angle 414 between its trailing side surfaces 408 that adjoin the trailing corner or surface 406.

Figure 5C:
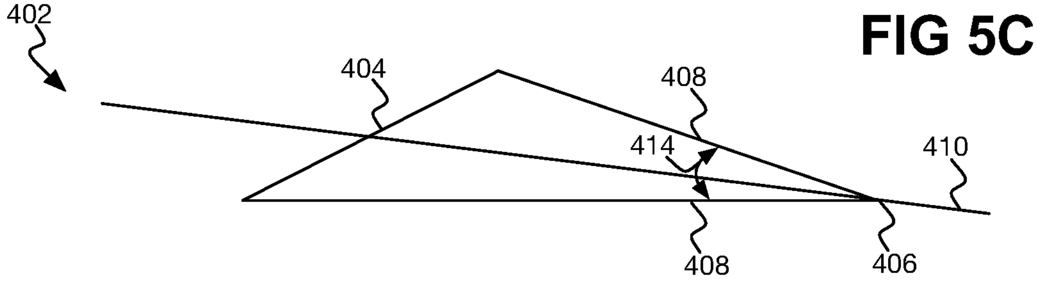

In FIG. 5C, the pillar 402 is asymmetrically shaped but has three sides. The leading corner or surface 404 is specifically a (non-corner) surface, whereas the trailing corner or surface 406 is a corner. The pillar 402 is positioned or oriented along a corresponding ray 410 that specifically bisects the leading corner or surface 404 and intersects the trailing corner or surface 406. The pillar 402 has a pillar angle 414 between its trailing side surfaces 408 that adjoin the trailing corner or surface 406.

Figure 5D:
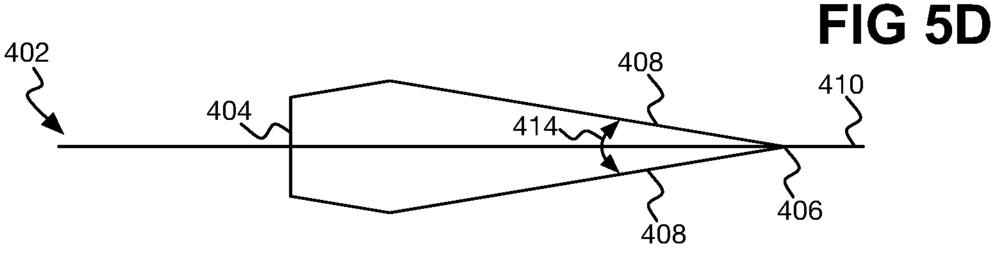
Figure 5E:
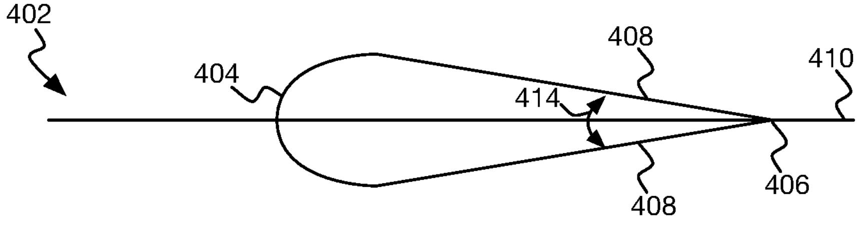

In FIG. 5D, the pillar 402 is symmetrically shaped and has five sides. The leading corner or surface 404 is specifically a (non-corner) surface, whereas the trailing corner or surface 406 is a corner. The pillar 402 is positioned or oriented along a corresponding ray 410 that specifically bisects the leading corner or surface 404 and intersects the trailing corner or surface 406. The pillar 402 has a pillar angle 414 between its trailing side surfaces 408 that adjoin the trailing corner or surface 406.

In FIG. 5E, the pillar 402 is again symmetrically shaped and has five sides. However, the leading corner or surface 404 is specifically a curved (and thus non-corner) surface, whereas the trailing corner or surface 406 is a corner. The pillar 402 is still positioned or oriented along a corresponding ray 410 that specifically bisects the leading corner or surface 404 and intersects the trailing corner or surface 406. The pillar 402 has a pillar angle 414 between its trailing side surfaces 408 that adjoin the trailing corner or surface 406.

As noted above in relation to FIG. 4A, as the turn angle 412 between adjacent pillars 402 increases, the pillar angle 414 of each pillar 402 has to decrease so that their sum remains less than the threshold angle. A small pillar angle 414 may result in pillars 402 that are thinner than can be fabricated, however. To compensate, the trailing corners or surfaces 406 of the pillars 402 may be curved surfaces instead of sharp corners. For example, where the distance between the trailing side surfaces 408 of a pillar 402 becomes smaller than the minimum permitted by the fabrication processes in question, the pillar 402 may be rounded such that the trailing side surfaces 408 adjoin a trailing corner or surface 406 that is a curved surface. However, this means that the meniscus of the fluid may become pinned at this location during passive chamber priming, resulting in incomplete fluid flow throughout the chamber 102.

Figure 6A:
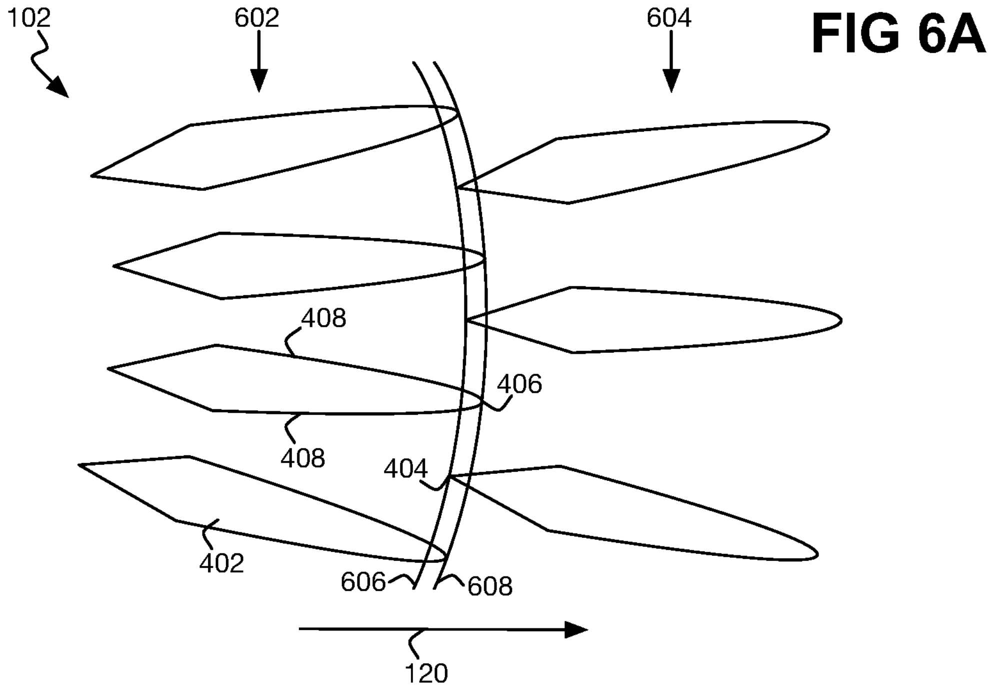
FIGS. 6A and 6B are diagrams of example rows of microfluidic device chamber pillars in detail, as to how the pillars of adjacent rows can be positioned relative to one another to promote fluid flow during priming.

FIG. 6A shows the pillars 402 organized along adjacent radial rows 602 and 604 of pillars 402. FIG. 6A specifically shows how if the pillars 402 of the row 602 are each rounded such that the trailing side surfaces 408 adjoin a trailing corner or surface 406 that is a curved (and thus non-corner) surface, the row 604 is positioned in relation to the row 602 so that fluid does not become pinned at the curved surfaces during priming of the chamber 102. The pillars 402 of the row 602 are radially oriented relative to one another, and likewise the pillars 402 of the next (i.e., adjacent) row 604 are radially oriented relative to one another. The rows 602 and 604 are positioned relative to the direction of fluid flow indicated by the arrow 120, such that the row 602 is closer to the chamber inlet 108 of FIG. 1A than the row 604 is.

The pillars 402 of the second row 604 are specifically radially oriented relative to one another such that a radial curve 606 contacts the leading corner or surface 404 of each of these pillars 402, which is specifically a sharp corner. (The radial curve 606 is not an actual part of the microfluidic device 100, but is depicted to show the positional relationship among the pillars 402.) In the case in which the leading corner or surface 404 is a surface, the radial curve 606 contacts a leading most point or points of the surface.

In the example, the pillars 402 of the first row 602 are specifically radially oriented relative to one another such that the radial curve 606 also intersects the locations of these pillars 402 at which the trailing side surfaces 408 of each pillar 402 meet or adjoin the trailing corner or surface 406. As noted, the trailing corner or surface 406 of each pillar 402 is a curved surface, and specifically starts where trailing side surfaces 408 begin to curve inwards; the radial curve 606 thus intersects the locations at which the trailing side surfaces 408 of the pillars 402 start curving inwards. The radial curve 606 therefore contacts the leading corners or surfaces 404 of the pillars 402 of the second row 604, and also intersects the locations of the pillars 402 of the first row 602 at which the trailing side surfaces 408 of each such pillar 402 meet or adjoin the trailing corner or surface 406.

Such positioning of the second row 604 of pillars 402 relative to the first row 602 of pillars 402 ensures that fluid does not become pinned at the trailing corners or surfaces 406 of the pillars 402 of the first row 602. That is, this positioning of the pillars 402 of the second row 604 relative to the pillars 402 of the first row 602 ensures that fluid does not become pinned where the trailing side surfaces 408 of the pillars 402 of the first row 602 curve inwards. Therefore, pillars 402 can be rounded if their pillar angle 414 results in too thin of a pillar 402 to be fabricated, without preventing fluid from completely flowing throughout the microfluidic device chamber 102 during priming.

Another radial curve 608 is also depicted in FIG. 6A. The radial curve 608 contacts the trailing corner or surface 406 of each pillar 402 of the first row 602. (The radial curve 608, like the radial curve 606, is not an actual part of the microfluidic device 100, but is depicted to show the positional relationship of the pillars 402.) In the example, in which the trailing corner or surface 406 of each such pillar 402 is a curved surface, the radial curve 608 specifically contacts the trailing most point of the curved surface.

To ensure that fluid does not become pinned at the trailing corners or surfaces 406 of the pillars 402 of the first row 602 during priming, more generally, the radial curve 608 is farther from the inlet 108 of FIG. 1A (and thus farther along the direction indicated by arrow 120) than the radial curve 606. That is, the rows 602 and 604 are positioned relative to one another such that the (first) radial curve 608 contacting the trailing corner or surface 406 of each pillar 402 of the first row 602 is farther from the inlet 108 than the (second) radial curve 606 contacting the leading corner or surface 404 of each pillar 402 in the second row 604. One specific such case is that which is shown in FIG. 6A, in which the radial curve 606 also intersects the locations at which the trailing side surfaces 408 of the pillars 402 of the first row 602 curve inward.

Figure 6B:
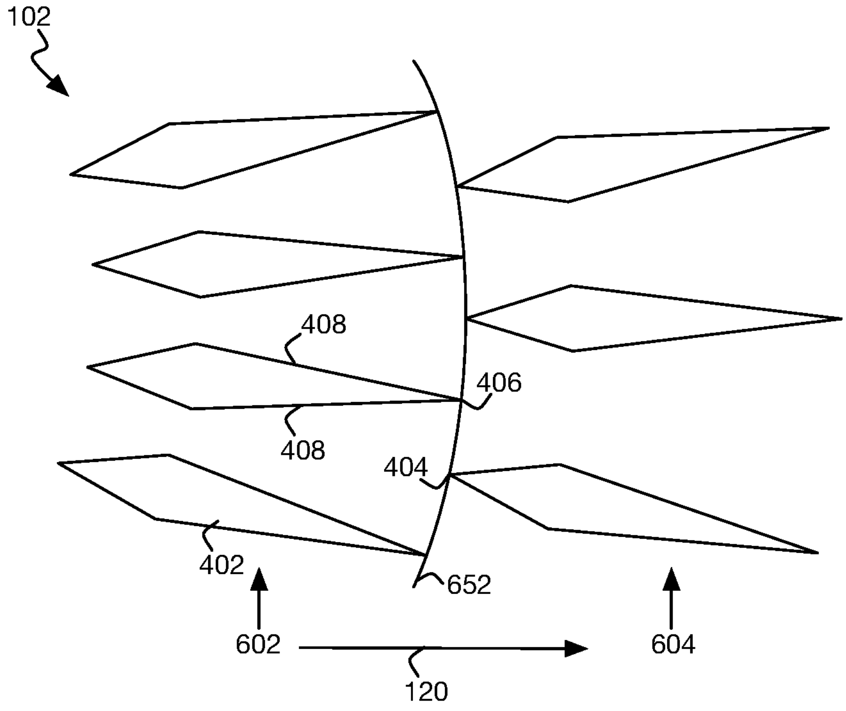

FIG. 6B shows another example of the pillars 402 organized the adjacent radial rows 602 and 604. FIG. 6B specifically shows how if the pillars 402 of the row 602 are each not rounded such that the trailing side surfaces 408 adjoin a trailing corner or surface 406 that is a corner, the row 604 is positioned in relation to the row 602 so that fluid does not become pinned during priming of the chamber 102. The pillars 402 of each row 602 and 604 are again radially oriented relative to one another, and the rows 602 and 604 are positioned relative to the direction of fluid flow indicated by the arrow 120 such that the row 602 is closer to the chamber inlet 108 of FIG. 1A than the row 604 is.

The pillars 402 of the first row 602 are specifically radially oriented relative to one another such that a radial curve 652 contacts the leading corner or surface 404 of each of these pillars 402, which is specifically a sharp corner. (The radial curve 652 is not an actual part of the microfluidic device 100, but is depicted to show the positional relationship among the pillars 402.) In the case in which the leading corner or surface 404 is a surface, the radial curve 606 contacts a leading most point or points of the surface. In the example, the pillars 402 of the first row 602 are specifically radially oriented relative to one another such that the radial curve 652 also contacts the trailing corner or surface 404 of each of these pillars 402, which is also specifically a sharp corner.

The radial curve 652 therefore contacts both the leading corners or surfaces of the pillars 402 of the second row 604 and the trailing corners or surfaces of the pillars 402 of the first row 602. Such positioning of the rows 602 and 604 ensures that fluid does not become pinned during priming of the chamber 102. More generally, the leading corners or surfaces of the pillars 402 of the second row 604 are no farther from the chamber inlet 108 of FIG. 1A than the trailing corners or surfaces of the pillars 402 of the first row 602 for fluid not to become pinned during priming.

Figure 7B:
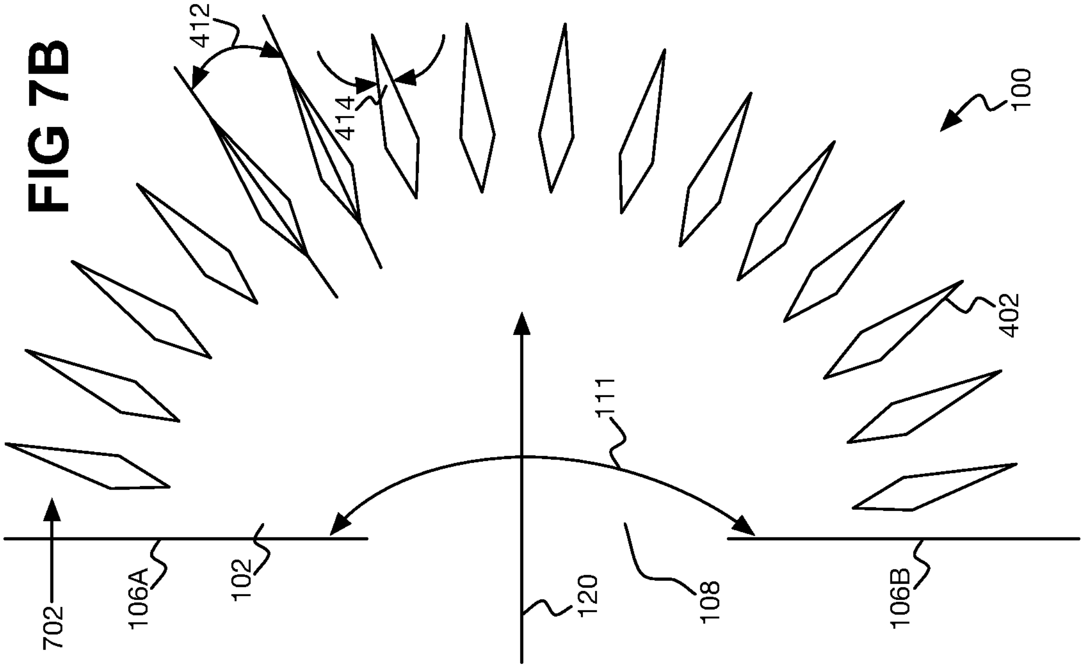
FIGS. 7A and 7B are diagrams of an example row of microfluidic device chamber pillars in detail, as to how the pillars within a row can be radially aligned with respect to one another to promote fluid flow during priming.
Figure 7A:
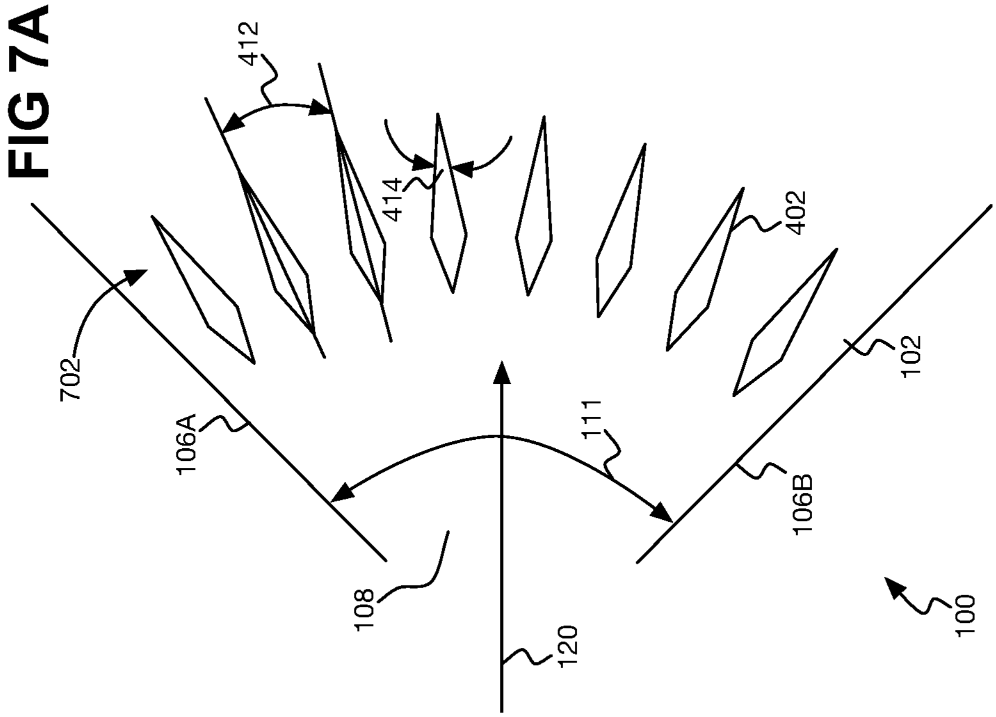

FIGS. 7A and 7B show an example radial row 702 of pillars 402 within the chamber 102 of the microfluidic device 100. In FIG. 7A, the chamber 102 has a spread angle 111 between inlet 108-adjacent sidewalls 106A and 106B of 90 degrees per FIG. 1A, and in FIG. 7B, the chamber has a spread angle 111 between inlet 108-adjacent sidewalls 106A and 106B of 180 degrees per FIG. 2. FIGS. 7A and 7B show how the pillars 402 within a row 702 can be radially aligned with respect to one another to promote fluid flow during chamber 102 priming.

Specifically, the pillars 402 are radially oriented relative to the inlet 108 at which fluid enters the chamber 102, per the direction of fluid flow indicated by the arrow 120. Adjacent pillars 402 in the row 702 are positioned relative to one another as described in relation to FIG. 4A. Furthermore, whereas just one row 702 is depicted in each example, there may be multiple such rows 702, where adjacent rows 702 can be positioned relative to one another as described in relation to FIG. 6A or 6B.

The number of pillars 402 in the (or each) radial row 702 is based on the chamber 102 spread angle 111 relative to the inlet 108 between the sidewalls 106A and 106B adjacent to the inlet 108, the turn angle 412 between adjacent pillars 402, the pillar angle 414 of each pillar 402, and the maximum inter-pillar separation distance preventing collapse or sag of the chamber 102. The turn angle 412 between each pair of adjacent pillars 402 in a given row 702 is the same, and the pillar angle 414 of each pillar 402 in a given row 702 is also the same.

The number of pillars 402 in a given radial row 702 is upper bounded by the spread angle 111 divided by the turn angle 412. That is, the number of pillars 402 in a row 702 is not greater than the spread angle 111 divided by the turn angle 412 between adjacent pillars 402 in that row 702. Further, the larger the spread angle 111, the greater the number of pillars 402 in a given row 702, with other constraints staying the same. For example, in the row 702, there are fewer pillars 402 in FIG. 7A than in FIG. 7B, since the spread angle 111 is 90 degrees in FIG. 7A but is 180 degrees in FIG. 7B.

Figure 8:
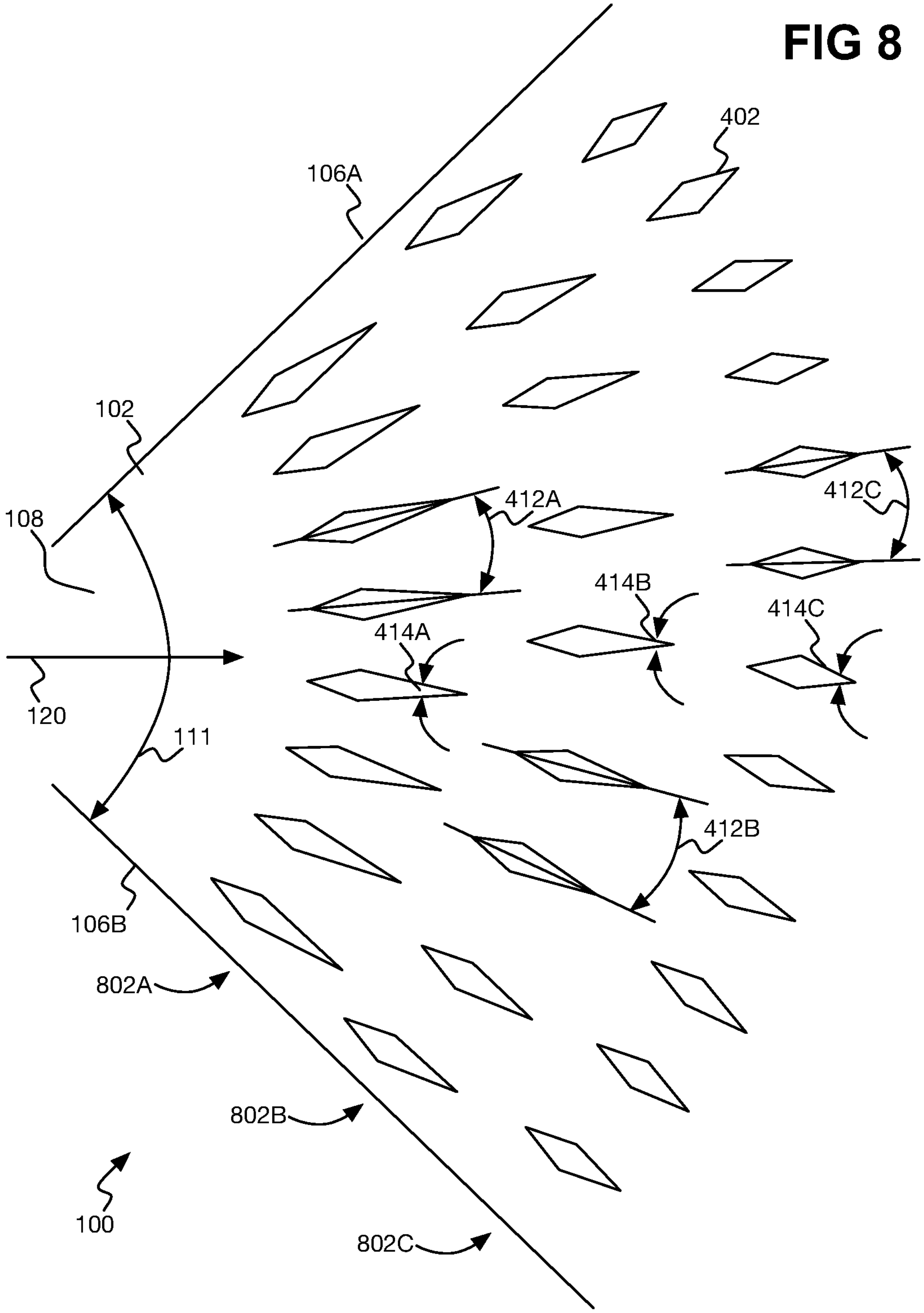
FIG. 8 is a diagram of example rows of microfluidic device chamber pillars in detail, as to how the turn angle of adjacent pillars decreases and how the pillar angles of the pillars increase with increasing distance from a chamber inlet.

FIG. 8 shows pillars 402 organized along example radial rows 802A, 802B, and 802C, collectively referred to as the radial rows 802, within a chamber 102 of a microfluidic device 100 that has a spread angle 111 between inlet 108-adjacent sidewalls 106A and 106B of 90 degrees, as in FIG. 1A. While there are three such rows 802 depicted in the example, there may be more than three rows 802. The pillars 402 of each row 802 are organized as described in relation to FIGS. 7A and 7B. Adjacent rows 702 can be positioned relative to one another as described in relation to FIG. 6A or 6B. Adjacent pillars 402 in each row 702 are positioned relative to one another as described in relation to FIG. 4A.

FIG. 8 shows that with increasing distance of the radial rows 802 from the inlet 108, the turn angle 412 of adjacent pillars 402 within each row 802 decreases while the pillar angle 414 of each pillar 402 increases. Specifically, each pair of adjacent pillars 402 within the row 802A has the same turn angle 412A, and each pillar 402 within the row 802A has the same pillar angle 414A. Each pair of adjacent pillars 402 within the row 802B has the same turn angle 412B that is thus less than the turn angle 412A, and each pillar 402 within the row 802B has the same pillar angle 414B that is less than the pillar angle 414A. Likewise, each pair of adjacent pillars 402 within the row 802C has the same turn angle 412C that is less than the turn angle 412B, and each pillar 402 within the row 802C has the same pillar angle 414C that is less than the pillar angle 414B.

Therefore, with increasing distance of the radial rows 802 from the inlet 108, the pillars 402 of each row increasingly turn or rotate inwards (i.e., the turn angle 412 decreases). With increasing distance of the radial rows 802 from the inlet 108, the pillars 402 of each row become shorter in length and/or wider in width (i.e., the pillar angle 414 increases), where in the example the pillars 402 specifically become shorter in length. Orienting the pillars 402 within radial rows 802 as shown in the example also promotes fluid flow throughout the chamber 102 during priming in the direction of fluid flow indicated by the arrow 120.

Fabrication constraints may prohibit pillars 402 from being placed sufficiently close to the inlet 108 to prevent pinning of a meniscus of fluid just inside of the inlet 108 of the chamber 102. For example, as shown in FIG. 8, fabrication constraints may prevent a row 802 of pillars 402 from being closer to the inlet 108 than the row 802A. Such a row 802 may nevertheless have to be included to ensure that passive priming of the chamber 102 occurs.

Figure 9:
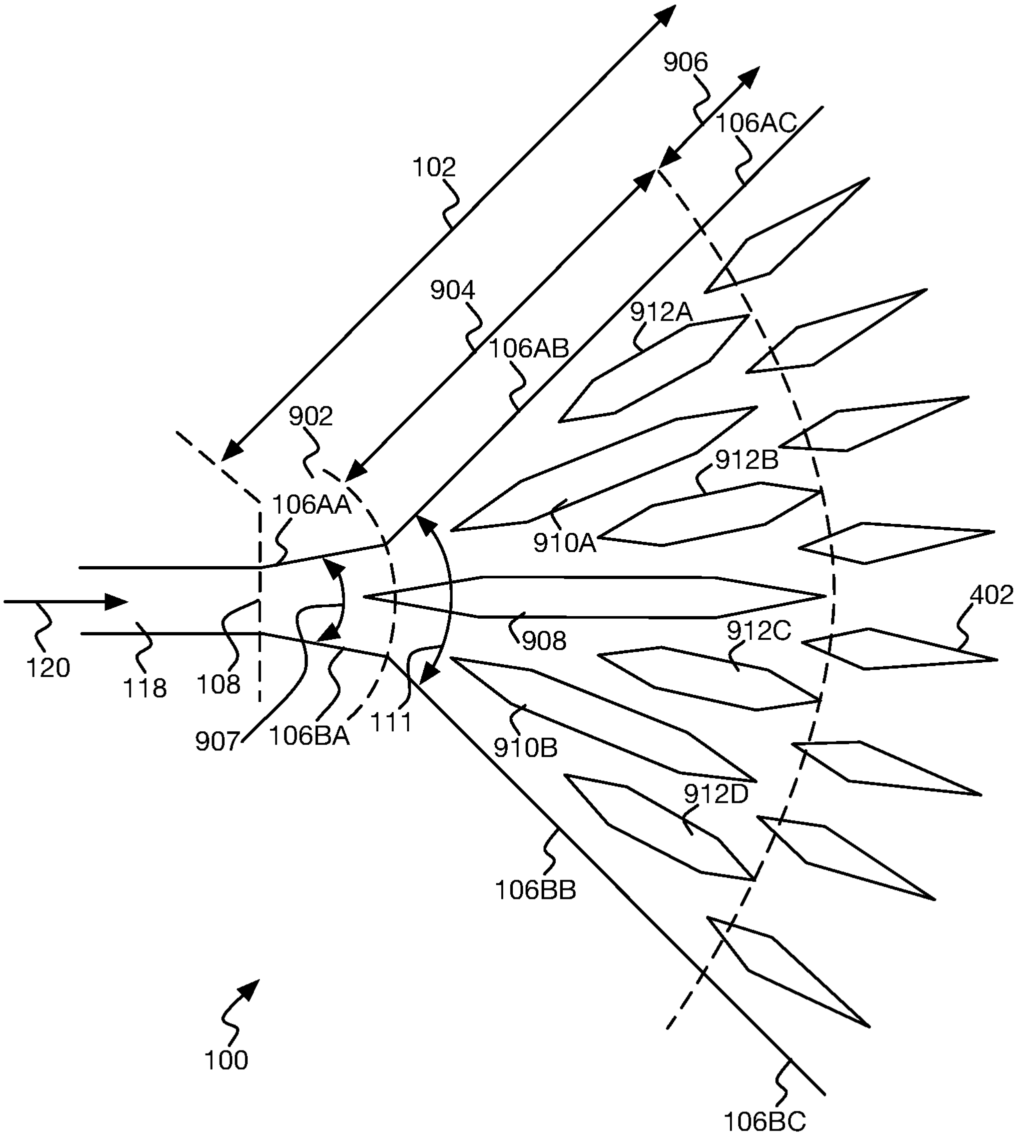
FIG. 9 is a diagram of an example microfluidic device chamber having an expansion region with no pillars, a transition region with bisecting pillars, and a primary region with other pillars to promote fluid flow during priming.

FIG. 9 shows an example chamber 102 of a microfluidic device 100 to ensure that passive priming of the chamber 102 can nevertheless occur in these instances. The chamber 102 has a spread angle 111 of 90 degrees, as in FIG. 1A. The chamber 102 is defined over three regions: an expansion region 902, a transition region 904, and a primary region 906. The expansion region 902 has sidewalls 106AA and 106BA, the transition region 904 has sidewalls 106AB and 106BB, and the primary region 906 has sidewalls 106AC and 106BC. The sidewalls 106AA, 106AB, and 106AC can be said to correspond to the sidewall 106A of FIG. 1A, and the sidewalls 106BA, 106BB, and 106BC can be said to correspond to the sidewall 106B of FIG. 1A.

The expansion region 902 is adjacent to the inlet 108 of the chamber 102 that is fluidically connected to the channel 118 from which fluid is received during priming in the direction indicated by the arrow 120. There are no pillars primarily located in the expansion region 902. A pillar is said to be primarily located in a region if the majority of the pillar is located in the region. The expansion region 902 has an expansion angle 907 between the sidewalls 106AA and 106BA that is equal to the threshold angle based on the fluidic contact angle. That is, the expansion angle 907 is equal to two times the difference of 90 degrees and the fluidic contact angle. Inclusion of the expansion region 902 at this expansion angle 907 ensures the fluidic priming occurs even if pillars 402 cannot be located near the inlet 108.

The transition region 904 is adjacent to the expansion region 902. The transition region 904 has a spread angle between the sidewalls 106AB and 106BB that is the chamber 102 spread angle 111, or 90 degrees in the example. Rather than including the pillars 402, which still may not be able to be formed in the transition region 904 due to fabrication constraints, the transition region 904 includes transition region-bisecting pillars 908, 910A and 910B, and 912A, 912B, 912C, and 912D, which are primarily located or disposed within the region 904. The pillars 910A and 910B are collectively referred to as the pillars 910, and the pillars 912A, 912B, 912C, and 912D are collectively referred to as the pillars 912.

The transition region-bisecting pillars 908, 910, and 912 are organized over hierarchical levels. The pillar 908 is the sole pillar within the highest or first hierarchical level, and bisects the transition region 904 in two, such that the pillar 908 is symmetrically positioned between the sidewalls 106AB and 106BB. The pillars 910 are the two pillars within the next or second hierarchical level. Each pillar 910 further bisects the transition region 904 as already bisected by the pillar 908. That is, the pillar 910A is positioned symmetrically between the sidewall 106AB and the pillar 908, whereas the pillar 910B is positioned symmetrically between the sidewall 106BB and the pillar 908.

The pillars 912 are the four pillars within the third hierarchical level, which is the last level in the example. The number of pillars 912 is thus double the number of pillars 910, which is double the number of pillars 908. Each pillar 912 bisects the transition region 904 already bisected by the pillars 908 and 910. That is, the pillar 912A is positioned symmetrically between the sidewall 106AB and the pillar 910A, the pillar 912B is positioned symmetrically between the pillar 910A and the pillar 908, the pillar 912C is positioned symmetrically between the pillar 908 and the pillar 910B, and the pillar 912D is positioned symmetrically between the pillar 910B and the sidewall 106BB.

The transition region 904 can include more than three hierarchical levels of transition-region bisecting pillars, depending on the fabrication constraints preventing inclusion of the pillars 402 within the region 904. In general, the number of pillars in each level other than the first level is greater than (e.g., equal to double) the number of pillars 402 in the immediately prior level. That is, the number of pillars 402 in each level other than the first level increases as compared to a prior level. Furthermore, each pillar of each level other than the first level further bisects the transition region 904 as has already been bisected by the pillars of the prior levels.

The primary region 906 is adjacent to the transition region 904. The primary region 906 also has the chamber 102 spread angle 111 between its sidewalls 106AC and 106BC, or 90 degrees in the example. The sidewalls 106AC and 106BC are thus collinear with the sidewalls 106AB and 106BB, respectively, of the transition region 904. The primary region 906 includes the pillars 402 that have been described, and which are primarily located within the region 906. The depicted pillars 402 may be the pillars 402 of the first radial row 802A of FIG. 8, and the primary region 906 may include additional rows 802 of pillars 402 per FIG. 8. In this respect, then, FIG. 9 shows a specific example of the portion of the chamber 102 between the inlet 108 and the first row 802A of pillars 402 in FIG. 8.

The microfluidic device chamber 102 has been shown as having square corners at adjoining sidewalls 106, such as in FIGS. 1A, 2, and 9. To further promote fluid flow throughout the chamber 102 during priming, and specifically to avoid trapping gas at the corners of the chamber 102, some of such chamber 102 corners may be rounded. That is, some adjoining sidewalls 106 may meet at curved surfaces instead of at shape corners.

Figure 10:
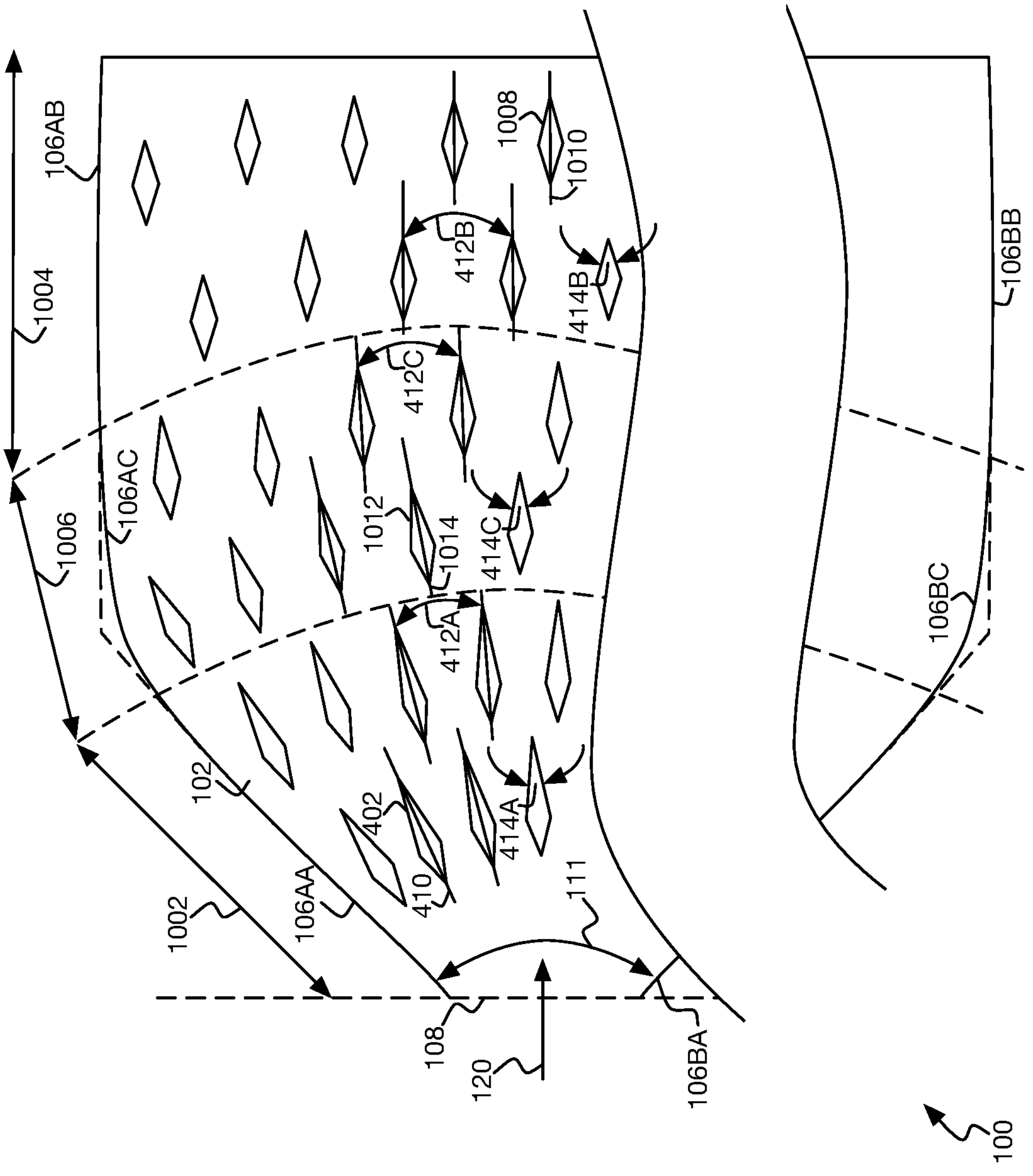
FIG. 10 is a diagram of an example microfluidic device chamber having an expansion region with radially aligned pillars, a transition region in which the turn angle of adjacent pillars decreases towards zero with increasing distance from a chamber inlet, and a primary region with pillars oriented parallel to chamber sidewalls to promote fluid flow during priming.

FIG. 10 shows an example of such a chamber 102 of a microfluidic device 100. The chamber 102 is more generally polygonal in shape, as opposed to being square in shape as in FIGS. 1A and 2. However, the chamber 102 has a spread angle 111 of 90 degrees, as in FIG. 1A. The chamber 102 is defined over three regions: an expansion region 1002, a primary region 1004, and a transition region 1006. The chamber 102 may also have additional expansion, transition, and regions 902, 904, and 906 per FIG. 9, between the inlet 108 and the pillars 402 closest to the inlet 108. Fluid enters the chamber 102 at the inlet 108, such that priming occurs in the direction of fluid flow indicated by the arrow 120.

The expansion region 1002 is adjacent to the inlet 108 and has sidewalls 106AA and 106AB between which the chamber 102 spread angle 111 is defined. The primary region 1004 has sidewalls 106AB and 106BB that are parallel to one another. The transition region 1006 is located between the expansion region 1002 and the primary region 1004. The transition region 1006 has sidewalls 106AC and 106BC that curve from their respectively adjoining sidewalls 106AA and 106BA of the expansion region 1002 to their respectively adjoining sidewalls 106AB and 106BB of the primary region 1004. If the sidewalls 106AC and 106BC were not curved, the sidewalls 106AA and 106BA of the expansion region 1002 would instead respectively meet the sidewalls 106AB and 106BB of the primary region 1004 at corners, which is indicated by dashed lines in FIG. 10. Because the sidewalls 106AC and 106BC are in fact curved, the likelihood that air is likely to become trapped at the sidewalls 106AC and 106BC during priming is reduced.

The expansion region 1002 includes the pillars 402 that have been described, which are oriented along corresponding rays 410. That is, the pillars 402 are primarily located in the expansion region 1002. The pillars 402 can be organized along radial rows per FIG. 8, with the pillars 402 of each row organized as described in relation to FIGS. 7A and 7B. Adjacent rows can be positioned relative to one another as described in relation to FIG. 6A or 6B. Adjacent pillars 402 in each row are positioned relative to one another as described in relation to FIG. 4A, specifically at a turn angle 412A that decreases with increasing distance from the inlet 108. The pillars 402 may be considered as first pillars 402 in the example.

The primary region 1004 includes pillars 1008 that are primarily located in the primary region 1004. The pillars 1008, which may be considered second pillars 1008 in the example, are oriented along corresponding rays 1010 that are parallel to the sidewalls 106AB and 106BB of the primary region 1004. Therefore, adjacent pillars 1008 effectively have a turn angle 412B that is equal to zero degrees. The transition region 1006 includes pillars 1012 that are primarily located in the transition region 1006, and may be considered third pillars 1012 in the example. The pillars 1012 are oriented along corresponding rays 1014 that decrease in turn angle 412C between the rays 1014 of adjacent such pillars 1012 towards zero degrees with increasing distance from the inlet 108.

That is, with increasing distance from the inlet 108, the pillars 1012 turn inwards until their corresponding rays 1014 are close to parallel to one another, such that the turn angle 412C between adjacent such pillars 1012 is close to or equal to zero degrees, where the transition region 1006 meets the primary region 1004. Where the transition region 1006 meets the expansion region 1002, the turn angle 412C between adjacent pillars 1012 is close to but slightly less than the turn angle 412A between adjacent pillars 402 of the expansion region 1002 that are farthest from the inlet 108. Overall, then, the pillars 402 decrease in turn angle 412A with increasing distance from the inlet 108, the pillars 1012 further decrease in turn angle 412C with increasing distance from the inlet 108, and the pillars 1008 have a smallest (and constant) turn angle 412B of zero degrees.

The pillars 402 of the expansion region 1002 have pillar angles 414A that increase with increasing distance from the inlet 108. The pillars 1012 of the transition region 1006 have pillar angles 414C that similarly increase with increasing distance from the inlet 108, such that where the transition region 1006 meets the expansion region 1002, the pillar angles 414C are close to but slightly greater than the pillar angles 414A. The pillars 1008 of the primary region 1004 have largest (and constant) pillar angles 414B, such that where the transition region 1006 meets the primary region 1004, the pillar angles 414C are close to but slightly less than the pillar angles 414B.

Techniques have been described for microfluidic device chamber pillars that promote fluid flow completely throughout the chamber during passive priming. Specifically, the angle between adjacent trailing side surfaces of adjacent pillars is less than a threshold angle that can be equal to two times the difference of 90 degrees and the fluidic contact angle. That is, the sum of the pillar angle of each pillar and the turn angle between adjacent pillars is less than this threshold angle. Such pillars permit passive priming to occur without having to introduce surfactants, and without having to change the material from which the microfluidic device is manufactured, which may otherwise necessitate different fabrication processes to be employed.

We claim:

1. A microfluidic device comprising:

a chamber having a floor, a ceiling, and an inlet; and a plurality of pillars extending from the floor to the ceiling of the chamber, each pillar having a leading surface or corner, a trailing surface or corner opposite the leading surface or corner, and trailing side surfaces adjoining the trailing surface or corner, wherein each pillar is oriented along a corresponding ray intersecting the leading surface or corner and the trailing surface or corner, wherein adjacent pillars have a turn angle between the corresponding rays of the adjacent pillars, and each pillar has a pillar angle between the trailing side surfaces thereof, and wherein a sum of the turn and pillar angles is less than a threshold angle equal to two times a difference between 90 degrees and a fluidic contact angle, to promote fluid flow from the inlet throughout the chamber during priming without fluidic pinning.

2. The microfluidic device of claim 1, wherein the threshold angle is 20 degrees.

3. The microfluidic device of claim 1, wherein the trailing surface or corner of each pillar comprises a non-corner trailing surface, the pillars are organized along radial rows, and adjacent radial rows include a first row closer to the inlet and a second row farther from the inlet, and wherein the first and second rows are radially positioned relative to one another such that a radial curve intersects locations at which the trailing side surfaces meet the non-corner trailing surface of each pillar of the first row and contacts the leading surface or corner of each pillar of the second row.

4. The microfluidic device of claim 1, wherein the trailing surface or corner of each pillar comprises a non-corner trailing surface, the pillars are organized along radial rows, and adjacent radial rows include a first row closer to the inlet and a second row farther from the inlet, and wherein the first and second rows are radially positioned relative to one another such that a first radial curve contacting the non-corner trailing surface of each pillar of the first row is farther from the inlet than a second radial curve contacting the leading surface or corner of each pillar of the second row.

5. The microfluidic device of claim 1, wherein the trailing surface or corner of each pillar comprises a corner, the pillars are organized along radial rows, and adjacent radial rows include a first row closer to the inlet and a second row farther from the inlet, and wherein the first and second rows are radially positioned relative to one another such that a radial curve contacts the corner of each pillar of the first row and contacts the leading surface or corner of each pillar of the second row.

6. The microfluidic device of claim 1, wherein the pillars are organized along radial rows, and a number of pillars in each radial row is based on a chamber spread angle relative to the inlet between sidewalls of the chamber adjacent to the inlet, the turn angle, and a maximum inter-pillar separation distance preventing collapse of the chamber from the ceiling to the floor.

7. The microfluidic device of claim 1, wherein the pillars are organized along radial rows, the turn angle of the adjacent pillars decreases with increasing distance of the radial rows from the inlet, and the pillar angle of each pillar increases with the increasing distance of the radial rows from the inlet.

8. The microfluidic device of claim 1, wherein the chamber further has:

an expansion region adjacent to the inlet in which no pillars are primarily located and having an expansion angle relative to the inlet between sidewalls of the expansion region equal to a threshold angle based on the fluidic contact angle;

a transition region adjacent to the expansion region and having a chamber spread angle relative to the inlet between sidewalls of the transition region; and a primary region adjacent to the transition region in which the pillars are primarily located and having the chamber spread angle relative to the inlet between sidewalls of the primary region that are collinear with the sidewalls of the transition region.

9. The microfluidic device of claim 8, wherein the microfluidic device further comprises a plurality of transition region-bisecting pillars primarily located within the transition region and organized over a plurality of hierarchical levels including a first level, wherein the first level includes one of the transition region-bisecting pillars, with a number of the transition region-bisecting pillars increasing in every level other than the first level as compared to a prior level, and wherein the one of the transition region-bisecting pillars of the first level is symmetrically positioned between the sidewalls of the transition region, and each transition region-bisecting pillar of every level other than the first level is symmetrically positioned between adjacent transition region-bisecting pillars of an immediately prior level or between one of the sidewalls of the transition region and one of the transition region-bisecting pillars of the immediately prior level.

10. The microfluidic device of claim 1, wherein the pillars are first pillars, and the chamber further has:

an expansion region adjacent to the inlet in which the first pillars are primarily located and having a chamber spread angle relative to the inlet between sidewalls of the expansion region;

a primary region in which second pillars are primarily located and having sidewalls parallel to one another, the second pillars oriented along corresponding rays parallel to the sidewalls of the primary region; and a transition region between the expansion and primary region in which third pillars are primarily located and having sidewalls that curve from the sidewalls of the expansion region to the sidewalls of the expansion region, the third pillars oriented along corresponding rays that decrease in turn angle towards zero degrees with increasing distance from the inlet.

11. A microfluidic device comprising:

a chamber having a floor, a ceiling, and an inlet; and a plurality of pillars extending from the floor to the ceiling of the chamber, each pillar having a leading surface or corner, a trailing surface or corner opposite the leading surface or corner, and trailing side surfaces adjoining the trailing surface or corner, wherein each pillar is oriented along a corresponding ray intersecting the leading surface or corner and the trailing surface or corner, wherein adjacent pillars have a turn angle between the corresponding rays of the adjacent pillars, and each pillar has a pillar angle between the trailing side surfaces thereof, and wherein a sum of the turn and pillar angles is less than a threshold angle equal to two times a difference between 90 degrees and a fluidic contact angle, to promote fluid flow from the inlet throughout the chamber during priming.

12. A microfluidic device comprising:

a chamber having a floor, a ceiling, and an inlet; and a plurality of pillars extending from the floor to the ceiling of the chamber, each pillar having a leading surface or corner, a trailing surface or corner opposite the leading surface or corner, and trailing side surfaces adjoining the trailing surface or corner, wherein each pillar is oriented along a corresponding ray intersecting the leading surface or corner and the trailing surface or corner, wherein an angle between adjacent trailing side surfaces of adjacent pillars is less than a threshold angle equal to two times a difference between 90 degrees and a fluidic contact angle, to promote fluid flow from the inlet throughout the chamber during priming.

13. The microfluidic device of claim 12, wherein adjacent pillars have a turn angle between the corresponding rays of the adjacent pillars, and each pillar has a pillar angle between the trailing side surfaces thereof, wherein the angle between the adjacent trailing side surfaces of the adjacent pillars is equal to a sum of the turn and pillar angles.

* * * * *